Feb. 3, 1970

W. G. PONTIS 3,492,868

FLUID METER CONSTRUCTION

Original Filed May 19, 1965

INVENTOR.
WILLIAM GRANT PONTIS
BY
*Kinney & Schenk.*
ATTORNEYS

INVENTOR.
WILLIAM GRANT PONTIS
BY Kinney & Schenk.
ATTORNEYS

Feb. 3, 1970  W. G. PONTIS  3,492,868
FLUID METER CONSTRUCTION
Original Filed May 19, 1965  6 Sheets-Sheet 5

INVENTOR.
WILLIAM GRANT PONTIS
BY
*Kinney & Schenk.*
ATTORNEYS

United States Patent Office 3,492,868
Patented Feb. 3, 1970

3,492,868
FLUID METER CONSTRUCTION
William Grant Pontis, Waverly, Ohio, assignor to William Grant Pontis and Paul R. Pontis, Springfield, Ohio, a joint venture
Continuation of application Ser. No. 456,965, May 19, 1965. This application May 29, 1968, Ser. No. 752,407
Int. Cl. G01f 3/08
U.S. Cl. 73—260          8 Claims

ABSTRACT OF THE DISCLOSURE

This disclosure relates to a fluid meter particularly to a vane type fluid meter which is constructed to accommodate expansion of the fluid passing therethrough as a result of freezing to return the same to operable position upon thawing and having means to prevent pressing the measuring vanes inwardly due to incoming fluid pressure and resilient support means which cause the parts to return automatically to their normal functions upon the melting of any frozen fluid therein.

---

This application is a continuation of application No. 456,965, May 19, 1965, now abandoned.

This invention relates to a fluid meter construction and, more particularly, to vane type fluid meters.

When a change of temperature, or freezing, causes an expansion of the fluid passing through a vane type fluid measuring device, this invention provides for automatic expansion of measuring chamber areas and later automatic restoration to return the affected parts to normal operating position.

Another feature of this invention includes a dividing member at the inlet of the apparatus, which divides the fluid flow into upper and lower streams, one of which can pass over the top edge and in behind the measuring vane while the other stream is passing simultaneously under the bottom edge and in behind the same measuring vane being extended. This prevents the incoming fluid pressing the measuring vanes inwardly as in prior constructions.

A further feature of this invention includes resilient supports for the various parts, and these are combined with yieldable or articulating constructions, which permit the parts of the cylinder and the rotor to separate and expand upon freezing expansion of liquid in the meter. The resilient parts will cause the parts to return automatically to their normal functioning condition upon the melting of the frozen material.

Still another feature of this invention includes a means of expelling backflow fluid and automatically lock-stopping the actuator when, for any reason, inflow fluid pressure fails and previously measured fluid returns under pressure to the meter, but without damage to the meter or reversal of the register amounts.

Other features are apparent from this disclosure, the appended claimed subject matter, and/or the accompanying drawings, in which:

The designs of many fluid meters used in residences and in industry are inherently inaccurate, and the literature of some meter manufacturers contain data sheets showing the lower degree of accuracy present under certain opertaing conditions. By contrast, the structures of this invention are inherently accurate regardless of the rate of flow within the size-capacity of the meters.

To illustrate, the wobbling slot in the disc of a wobble disc meter, as the disc traverses from one position to the other on the stationary divider plate, creates relatively violent action, which in operation progressively wears the wobbling slot, thereby causing continuous increasing wear, increased leakage, and need for adjusting the accuracy of the meter. By contrast, the components in this invention work in harmony with each other without such stresses and mechanical strains.

My co-pending patent application, Ser. No. 409,044, filed Oct. 28, 1964, and entitled "Fluid Metering Device," covers a vane type fluid meter and comprises broadly an irregular cylinder, within or excluding a housing, having an inlet port and an outlet port. A rotative rotor within the irregular cylinder has pivotally mounted vanes thereon with a measuring portion of the vanes outside of the rotative rotor and the inner actuator portions of the same vanes functioning within the rotor around a stationarily mounted configurated actuator.

Incoming fluid drives the measuring vanes through a measuring chamber located between the circular portion of the stationary cylinder and the outer walls of the enclosed rotating rotor toward a fluid outlet port. Since these vanes are mounted on the rotor, the number of turns of the rotating rotor becomes a mechanical basis for determining the volume of fluid passing through the measuring chamber. The rotor may be coupled directly or indirectly to a standard register and to other devices.

The word "cylinder," as herein used, has a broader meaning such as is implied by the word "cylindraceous." However, the word "cylinder" is used herein with the understanding that the perimeter of such cylinder is irregular. In the present invention, the cylinder is not circular except in its measuring chamber portion.

Words such as "vertical" and the like, which indicate direction or relative position, are used in the specification and claims for the sake of clearness and brevity of description. However, it is to be understood that the word "vertical" and the like are used only to describe the positions shown in the drawings, and that the parts so described in actual devices may be in entirely different directions, if desired.

STRUCTURES CONSIDERED NEW IN THIS TYPE METER

Direct incoming fluid action to extend the measuring vanes

Pivoted vane type measuring devices depend, for accuracy, on a positive means for fully extending the measuring vanes in timed engagement with the measuring chamber cylinder wall. This is best automatically accomplished with the direct and positive assistance of the force of the inflowing fluid applied not merely to the tip of the measuring vane but to the back or trailing face of the extending measuring vane throughout the extending movement of the measuring vane.

The measuring vane stabilizer

The purpose of the measuring vane stabilizer is to eliminate wear of both the measuring chamber cylinder wall and the measuring vane tip. It also limits the pressure of the vane tip on the cylinder wall and maintains, for life, a uniform pressure and sealing engagement between the tip of the measuring vane and the cylinder wall while the measuring vane traverses the measuring chamber.

Means to enable a meter to respond automatically to freezing and melting

Most residential water meters are subject to damage from freezing temperatures evidenced by the common use of a breakable freeze plate, which is designed to break under freeze conditions with resulting annoyance to users and losses to utility companies. The present invention provides for the use of articulated structures, automatic expansion of the affected meter structure incident to freezing, and for automatic restoration to normal function upon melting.

Backflow protection

Fluid system failures in a supply line leading to a meter (in the absence of a check valve), that supplies a building causes the measured fluid within pipes higher than the meter to backflow. In present meters, this reverses the meter and its register with resulting loss to the utility company. This invention provides an automatic backflow relief means, which cooperates with a locking of the measuring vanes and with automatic restoration of normal meter function when fluid service is restored.

Articulated structures in a meter

Articulated structures in a meter do not consist of merely nesting or cradling certain parts or sub-assemblies of the meter by the use of resilient supports at appropriate places. It also is not accomplished by the use of resilient parts employed as seals to avoid leakage.

This articulated design of the present invention uses free-floating pins and resilient retainers for the pins or their equivalent to provide for automatic expansion of parts affected by freezing temperatures. These structures also maintain alignment of the structures to automatically restore the structures to normal operating position when melting occurs. The articulated design may also use the previously mentioned resilient supports and resilient seals to assist in the articulating function.

The description of the articulated structures, used to expand and contract because of freezing, are referred to herein when describing the rotor assembly, the cylinder assembly, and the housing assembly.

Substantially all fluid meters are rigid structural devices with no practical provision for automatic protection of the meter from damage when freezing takes place. To partially protect the meter, most meter manufacturers supply liquid meters with a breakable freeze plate, which breaks during freezing. Present liquid meters have no means to automatically expand the parts affected by freezing or to automatically restore such parts to normal operation when melting occurs.

In the present invention, while providing for combined articulation, the same design uniquely lends itself to the following:

(a) Automatic protection of the meter against damage resulting from the freezing of liquids.

(b) Automatic restoration to normal operation when melting occurs.

(c) Automatic provision for avoiding reverse of meter registration losses incident to backflow action during system failure.

(d) Simplification of meter assembly.

Accuracy of meters

The advertising literature of most large manufacturers of meters for measuring various liquids show a large degree of expected inaccuracies at various rates of flow and pressures. Such inaccuracies are designed into presently used measuring chambers of meters and into the couplings or transmissions, which translate measuring chamber values to registers or other attached or remotely operated devices.

By contrast, both large and small meters produced in accordance with this invention, when using transmissions or couplings disclosed in my co-pending application, Ser. No. 374,885, filed June 5, 1964, and entitled "Power Transmission Device Particularly for Fluid Applications," will accurately measure either the smallest flow or the largest flow because they are substantially nonleaking devices.

There are basic accuracies designed into the measuring chambers and couplings of this invention. They are inherently free from the meter constructions presently used which cause mechanical or other difficulties in commercial meters as distinguished from precise laboratory structures.

GENERAL DESCRIPTION

Figure 1:
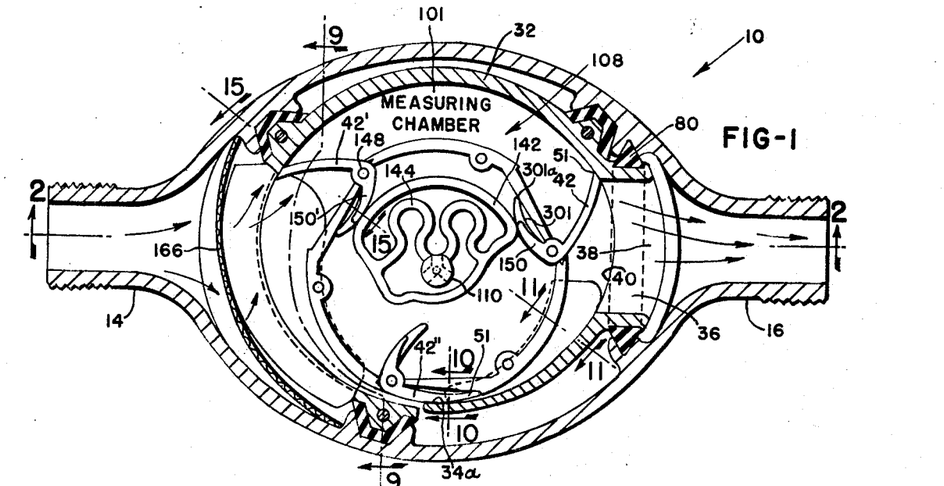
FIGURE 1 is a horizontal cross sectional view along the axis of the fluid inlet and outlet of the meter showing reference numbers relating to the general description of the device and also to the mechanical operation of the measuring section of the device.
Figure 2:
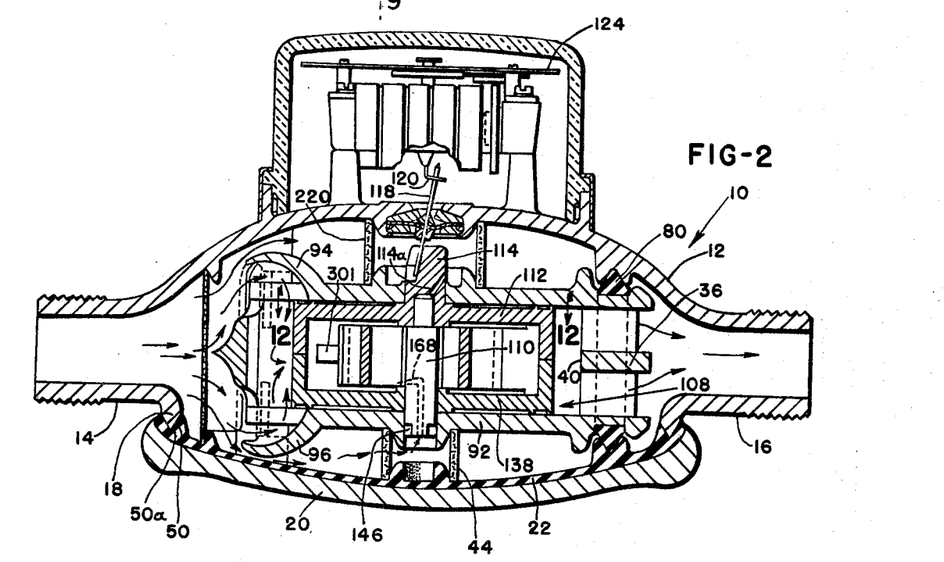
FIGURE 2 is a vertical cross sectional view generally along the line 2—2 of FIGURE 1 and showing reference numbers relating to those shown in FIGURE 1.

It should be noted that for proper explanation of certain functions of this meter, it is necessary at times to repeat description of functioning structures, which also are described in connection with some other feature of the meter. Referring to FIGURES 1 and 2, a fluid meter according to this invention may have a housing 10. The housing 10 includes an upper inverted cup shaped casting 12 or the like with an inlet 14 and an outlet 16. The housing 10 also has a lower rim 18, which surrounds a third opening, to which is sealed a bottom plate 20.

A resilient liner 22 is interposed between the housing casting 12 and the bottom plate 20. The casting 12 and the bottom plate 20 may be secured together by any suitable means such as is shown in FIGURE 9.

Figure 9:
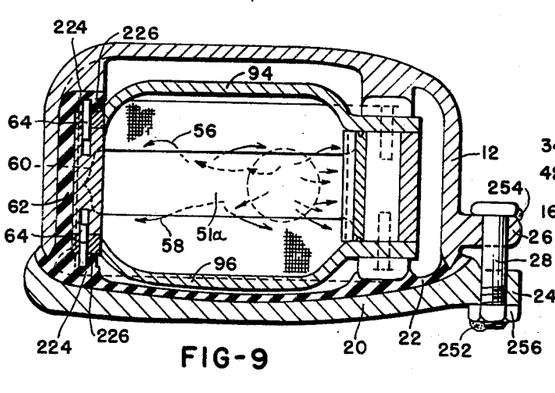
FIGURE 9 is a vertical cross sectional view along the irregular line 9—9 of FIGURE 1.
Figure 9A:
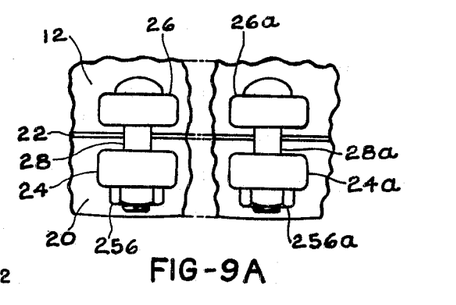
FIGURE 9A is a fragmentary view showing spaced bolts for securing the bottom closure plate to the housing casting.

In FIGURES 9 and 9A there is shown a non-articulating means for securing the bottom closure plate 20 and the seal liner 22 to the housing casting 12 by means of spaced bolt and nut assemblies incorporating a bolt head lug 26 and 26A on the housing casting 12, a bolt lug 24 and 24A on the closure plate 20, a bolt 28 and 28A, nuts 256 and 256A, a nut to bolt solder weld 252 (FIG. 9), and a bolt head to lug solder weld 254 (FIG. 9). While two bolts 228 and 228A are shown and are preferred, it should be understood that the invention is not limited to a plurality of bolts since it is conceivable that one bolt would provide sufficient seal to produce an operative construction. (See FIGURE 15A.)

A cylinder 30 is disposed within the housing 10. The cylinder 30 includes a top head 90 and a bottom head 92. (See FIGURES 3 and 4.) The side wall of the cylinder 30 includes a portion 32, which is the outer wall of a measuring chamber 101, and an articulating portion 34. As shown in FIGURE 1, one end of the measuring chamber portion 32 and one end of the articulating portion 34 are spaced from each other to form a cylinder outflow or outlet port 38, which discharges into the housing outlet 16. These spaced ends are held together by a horizontal tracking bridge 36, which extends across the port 38.

The cylinder heads 90 and 92 are substantially flat except in the area adjacent the housing inlet 14. In this area, the top cylinder head 90 has a curved baffle 94, which extends upwardly above the substantially horizontal plane of the remainder of the cylinder head 90. Similarly, the bottom cylinder head 92 has a curved baffle 96, which extends downwardly below the substantially horizontal plane of the cylinder head 92.

Figure 6:
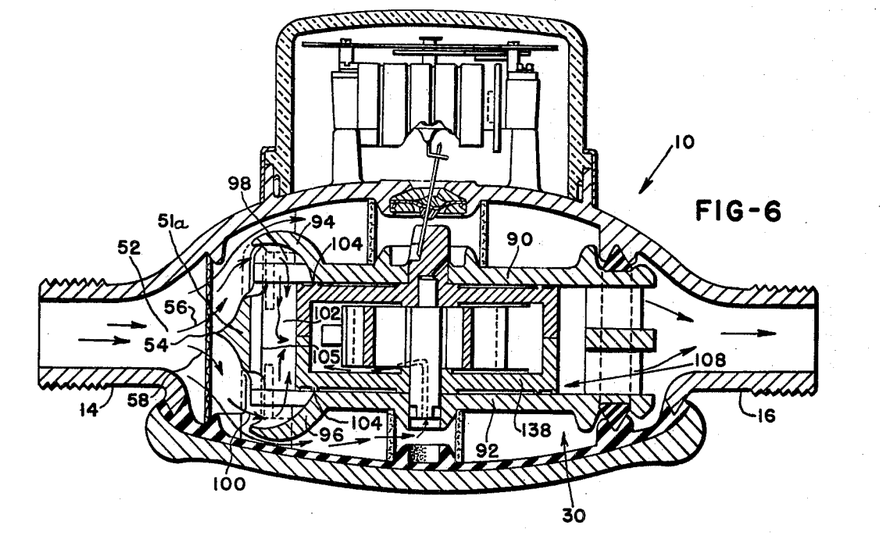
FIGURE 6 is the same view as FIGURE 2 but showing reference numbers relating to those shown in FIGURE 5.

A divider 51a is positioned between the curved baffles 94 and 96 as shown in FIGURE 6. The divider 51a has a dividing edge 54 to divide the fluid flowing into the housing through the inlet 14.

The divider 51a and the cylinder 30 are resiliently mounted within the housing 10. As shown in FIGURE 9, each end of the divider 51a has a mounting lug 60, which has a recess in each end thereof. One of the recesses receives one end of a full floating pin 64, and the other of the recesses receives one end of a second full floating pin 64. Each of the cylinder heads 90 and 92 has a mounting lug 60 with a passage extending therethrough so that one of the full floating pins 64 extends through one of the lugs 60 and the other of the pins 64 extends through the other of the lugs 60.

A resilient mounting retainer 62 is disposed in the housing 100 and partially encompass the lugs 60. Furthermore, the retainer 62 has its upper and lower ends 224 extending inwardly as shown in FIGURE 9. These inwardly extending ends 224 provide resilient layers above the mounting lug 60 of the bottom cylinder head 92. This arrangement resiliently encloses and locks the full floating pins 64 in place.

Since the divider 51a has the mounting lugs 60 cooperating with only two of the three resilient mounting retainers 62 because of the divider's arcuate length, which is between the two lugs 60, suitable means must be provided in the third retaining member 62 to hold the floating pins 64, which pass through the lugs 60 on the cylinder heads 90 and 92, in the desired position. This could be a lug, which extends from the side wall of the cylinder 30.

This arrangement of the cylinder assembly within the housing 10 provides for automatic expansion of the cylinder assembly during freezing of the fluid being measured and restoration of the cylinder assembly to normal upon melting of the frozen fluid and renewal of fluid flow.

Figure 3:
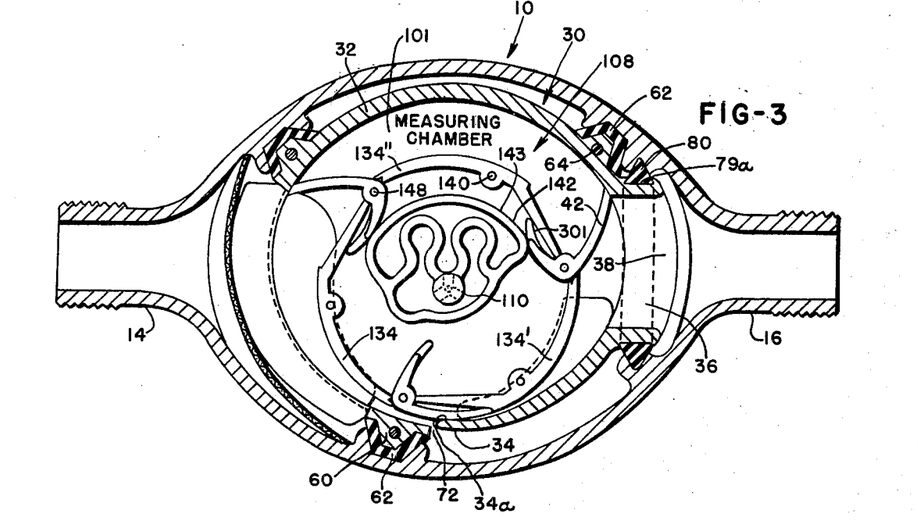
FIGURE 3 is the same view as FIGURE 1 but showing reference numbers relating to the system of articulating structures.

A stationary actuator shaft 110 is attached to the bottom cylinder head 92 by spline-shaped keys 146. The shaft 110 has a stationary actuator 142 formed integral therewith through a resilient supporting member 144. The material of the shaft 110, the actuator 142, and the member 144 is yieldable or resilient. As shown in FIGURE 3 the actuator 142 has a face 143, which is concentric with the axis of the shaft 110, on one side thereof.

A rotor 108 surrounds the actuator 142 and is disposed within the cylinder 30. The rotor 108 is a shell formed of an upper half and a lower half. The upper half includes a top wall 112 having a plurality of vertical rotor walls 132, 132', and 132" integral therewith and extending downwardly therefrom. The lower half includes a bottom wall or plate 138 and a corresponding set of vertical upstanding walls 134, 134', and 134", which are integral with and carried by the bottom wall 138. The walls 132, 132', and 132" extend downwardly so that their bottom faces engage the top faces of the walls 134, 134', and 134" at 140a. (See FIGURES 3, 4, and 11.)

The downwardly extending rotor walls 132, 132', and 132" cooperate with the upwardly extending rotor walls 134, 134', and 134" and are respectively rotationally maintained in alignment by means of full floating rotor alignment pins 140, which extend respectively from each of the downwardly extending walls into each of the cooperating upwardly extending walls. The pins 140 maintain the rotor top wall 112 of the rotor 108, the bottom wall 138 of the rotor 108, and the vertical walls aligned together for rotation as a unit. The full floating rotor alignment pins 140 are longitudinally movable within the holes that retain them.

The joining faces of the top and bottom shells at 140a provide for the rotor 108 being assembled in two parts so that the stationary actuator 142 can be placed within the rotor chamber during assembly. Also, the upper and lower halves of the shell of the rotor 108 can yield to freeze expansion.

The rotor 108 is rotatably mounted on the actuator shaft 110. The upper wall 112 of the rotor 108 rides on a reduced portion 115 of the shaft 110. The upper wall 112 of the rotor 108 has an upwardly extending driver shaft 114, which extends through the top cylinder head 90. (See FIGURE 2.)

The interior of the rotor 108 is filled with fluid from the housing inlet 14. The fluid flows from the housing inlet 14 through a screen 166, which is disposed adjacent the housing inlet 14 to filter the entering fluid, and then through an annular filter 44, which extends downwardly from the bottom cylinder head 92 to the resilient liner 22 as shown in FIGURE 2, into one end of a passage 168 in the stationary shaft 110. The other end of the passage 168 communicates with the interior of the rotor 108.

Figures 15, 16:
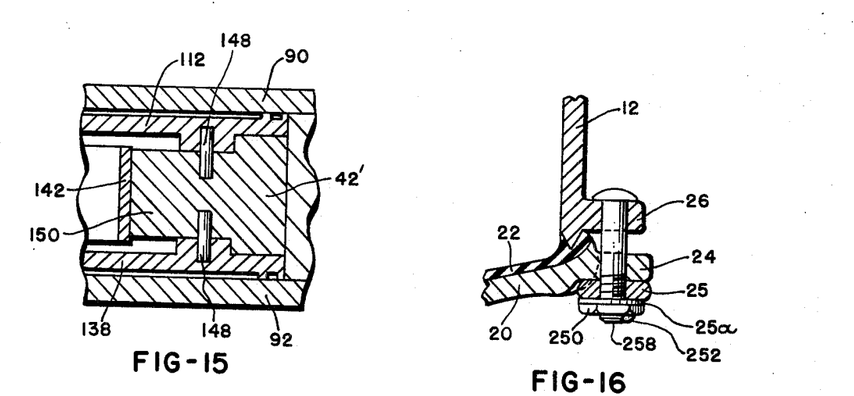
FIGURE 15 is a vertical cross sectional view along the irregular line 15—15 of FIGURE 1.
FIGURE 16 shows a sectional view of a resilient housing closure bolt nut assembly.

A plurality of measuring vanes 42, 42', and 42" are pivotally mounted on the perimeter wall of the rotor 108 by full floating vane pivot pins 148 (see FIGURE 15). As shown in FIGURE 15 for the vane 42', one of the pins 148 is inserted into the top wall 112 of the rotor 108 and the other of the pins 148 is inserted into the bottom wall 138 of the rotor 108.

Each of the measuring vanes 42, 42', and 42" has an outer measuring portion, which is exterior of the rotor 108. The measuring vanes 42, 42', and 42" have inner actuator portions 150, 150', and 150", respectively, which are inside of the rotor 108. The outer portion of each of the vanes 42, 42', and 42" passes through the measuring chamber 101, which is the part of the fluid passageway between the housing inlet 14 and the housing outlet 16 that is circular and concentric with the axis of the shaft 110.

When first placing an empty meter in service, the inflowing fluid can also fill the areas on the outside of the cylinder assembly such as moving past the outer parts of the baffles 94 and 96 as indicated by arrows in FIGURES 2 and 6. However, an annular seal 80 near the outlet 16 prevents any of this filling of isolated fluid from passing to the outlet 16. The pressures of the isolated fluids throughout the meter structure are such that a substantially balanced pressure is maintained throughout the measuring body.

In FIGURES 1, 3, 5, and 7, the measuring chamber 101 is that part of the fluid passageway between the inlet 14 and the outlet 16 which is circular and concentric with the axis of the stationary actuator shaft 110. The face 143 of the actuator 142, which is adjacent to the measuring chamber portion 32 of the cylinder side wall, is also concentric with the measuring chamber 101, the rotor 108, and the axis of the stationary actuator shaft 110.

The measuring vanes 42, 42', and 42" are rotated by the action of the fluid passing along the measuring chamber 101 from the inlet 14 to the outlet 16. The vanes 42, 42' and 42" in turn, rotate the rotor 108. All of the vanes within a particular meter are pivotally mounted equidistantly on the particular enclosed rotative rotor 108. While the rotor 108 rotates clockwise, as viewed in FIGURE 1, it should be understood that the measuring device components could be constructed so that the rotor 108 operates counterclockwise.

While the measuring portion of each of the vanes 42, 42', and 42" is fully extended as it passes through the measuring chamber 101, the inner actuator portion of the same vane is fully retracted and is being moved on the inside of the rotor between the inside rotor wall and the concentric face 143 of the stationary actuator 142, which is adjacent to the measuring chamber 101. (See FIGURE 1.)

When one of the fully extended measuring vanes 42, 42', and 42" is nearing the exit of the measuring chamber 101, at least one other following and fully extended of the measuring vanes 42, 42', and 42" is being driven by the inflowing fluid into or through the measuring chamber 101. The inflowing fluid also directly assists in extending the measuring vanes before they reach the measuring chamber 101. This action will be commented upon separately hereinafter.

As the inflowing fluid drives each of the measuring vanes 42, 42', and 42" they in turn rotate the enclosed rotor 108 around the actuator 142, which is stationarily mounted within the rotor 108. This fluid action drives each of the extended measuring vanes 42, 42', and 42" through the measuring chamber 101. Thereafter, the rotor 108 moves each of the measuring vanes 42, 42', and 42" to its fully retracted position at a zero torque seal line 34a, which separates the outflow zone from the inflow zone of the meter, by cooperation with the articulated portion 34 of the side wall of the cylinder 30.

The tracking bridge 36 has an inner tracking surface 40 (see FIGURES 1 and 2) for the purpose of preventing the tip end of each of the measuring vanes 42, 42', and 42" from moving into the outflow port 38.

The inner actuator portions 150, 150', and 150" of each of the vanes bear against the concentric portion of the outer wall of the stationary actuator 142 while each of the measuring vanes 42, 42', and 42" traverses the measuring chamber 101. While moving through the measuring chamber 101, each of the measuring vanes 42, 42', and 42" has its edges in sealing engagement with the measuring chamber 101 so that the fluid entering at the inlet 14 cannot pass around the measuring vanes 42, 42', and 42", but must push these vanes to cause rotation of the rotor 108. The rotational motion of the measuring 42, 42', and 42" rotates the rotor 108 and the driver shaft 114 on the rotor 108. This in turn engages a nutating means to operate a register 122. (See FIGURES 2 and 8.)

AUTOMATIC ADJUSTMENT DURING AND AFTER FREEZING

The meter construction of this invention can be very easily assembled. It also provides a construction which resists damage from the freezing of a fluid within the meter and also resists damage from the thawing of any frozen fluids after such freezing operation.

This construction results in a completely articulating or expansible system, which will respond to extreme or icing conditions. Expansion and contraction upon freezing and melting are possible, and all the parts will return to their normal functioning relations after melting occurs.

Figure 4:
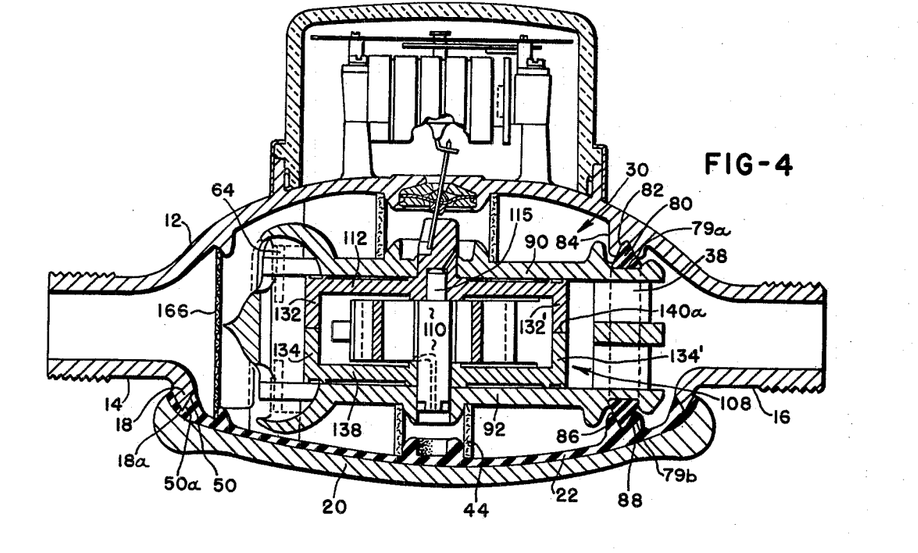
FIGURE 4 is the same view as FIGURE 2 but showing reference numbers relating to those shown in FIGURE 3.

Referring to FIGURES 3, 4, and 15, the rotor 108 has two or more of the full floating locating alignment pins 140 located in the perimeter wall of the rotor 108 with each pin extending into both top and bottom halves of the rotor shell to provide for automatic expansion of the assembled rotor shell during abnormal fluid expansion caused by temperature changes and also providing for automatic restoration to normal operating condition upon normalizing of the temperature of the fluid.

As shown in FIGURES 3, 9, and 15, the rotor 108 also has four or more of the full-floating pivoting pins 148 located in the top and bottom walls of the rotor shell near the outer perimeter of the rotor shell for the purpose of mounting the pivoted vanes and also to provide for automatic expansion of the rotor assembly during abnormal fluid temperature changes and restoration to normal upon normalizing of the fluid.

Figure 15A:
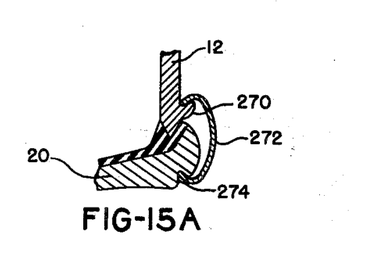
FIGURE 15A is a fragmentary sectional view showing a modification of FIGURE 17 in which a C-clamp is used to secure the bottom closure plate to the housing.

FIGURE 15A shows a modified means for forming a seal closure between the closure plate 20 and the housing casting 12. The housing casting 12 is provided with a projecting lip 270 which may extend completely around the periphery of the housing 12. The intersection of the upper surface of the lip 270 and the outer side wall of the housing 12 form a trough which is adapted to receive the upper edge of a C shaped retainer 272. In a like manner the closure plate 20 is provided with a groove or recess 274 which may extend completely around its periphery and is adapted to receive the lower edge of the C shaped retainer 272. The C shaped member 272 may be constructed of any suitable material and is sufficiently resilient and so sized as to place the members 12 and 20 in compression when installed as seen in FIGURE 15A. It will be understood that the retainer member 272 may extend completely around the entire periphery of the device and thereby apply constant and uniform pressure to hold the members 12 and 20 in sealing engagement.

THE MEASURING VANE STABILIZER

In the absence of some means to automatically limit the amount of pressure exerted by the measuring vane tip 51 of each of the vanes 42, 42', and 42" on the inside wall of the cylinder 30 throughout the measuring chamber 101, there could likely be excessive wear on either the inside of the measuring chamber portion 32 of the side wall of the cylinder 30 or the measuring vane tip 51. To assure a uniform and controlled sealing engagement of the vane tip 51 throughout the measuring chamber 101, a measuring vane stabilizer 301 is made a part of each of the inner actuator portions 150, 150', and 150". (See FIGURES 1, 2, and 14.) The stabilizer 301 operates with the pivotal inner actuator vane portion 150, 150', and 150" to permit limiting stop-engagement of the projection of the stabilizer 301 to the inside of the side wall of the rotor 108 as shown at 301a (see FIGURE 1) so as to establish positive but controlled sealing engagement of the tip 51 of the measuring vane 42 as it traverses the measuring chamber portion 32 of the cylinder wall for the purpose of ensuring against wear of the measuring vane 51 and of the measuring chamber portion 32 of the cylinder side wall. After the measuring vane 42 passes the end of the measuring chamber 101, the inner actuator portion 150 and its stabilizer portion 301 move out of contact with the actuator 142, and the actuator 142 and the stabilizer 301 end their control of the measuring vane 42. The same arrangement occurs for the vanes 42' and 42" as they move through the measuring chamber 101.

LUBRICATION OF PARTS

Figures 13, 14:
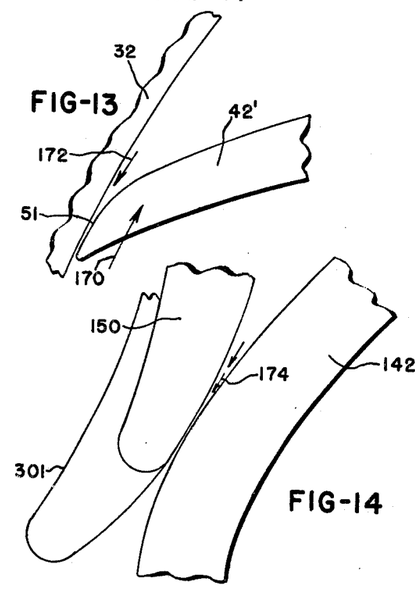
FIGURES 13 and 14 are diagrammatic enlarged views of the action taking place at the outer and inner ends of the vane construction at the upper left hand portion of FIGURE 1.

At various points of the measuring device, the use of tangential liquid or fluid edge wedge entry principle is employed to ensure proper and continuous lubrication and fluid separation between any two or more continuous points of contact. For instance, as is seen in FIGURE 13, the tip 51 of the measuring vane 42' shows a tangential fluid wedge entry 172 between the measuring vane tip 51 and the measuring chamber portion 32 of the cylinder side wall. Similarly in FIGURE 14, tangential fluid wedge entry 174 functions between the concentric portion of the outer wall of the actuator 142 and the tip face of the inner actuator portion 150. Similar means are employed at the zero torque seal line 34a.

As shown at the bottom of FIGURE 2, fluid passes through a very fine annular filter 44. The filter 44 may be so fine that only particles of a few microns in dimension can pass through it so that none of the moving parts is likely to be damaged. The fluid passes through the passageway 168 in the actuator shaft 110 into the inside of the rotor 108. The driver or rotor shaft 114 has a passageway 114a (see FIGURE 2), which permits fluid to enter the space between the upper end 115 of the stationary shaft 110 (see FIGURE 2) and the upper rotor wall 112.

There is a constant fluid wedge action, which maintains a very close contact between the measuring vane 42', for example, with the measuring chamber portion 32 of the cylinder side wall as shown in FIGURE 13. There is only a minute fluid skin action between these surfaces, which maintains a substantially non-friction sealing action by the fact that the fluid pressure on the rear or trailing side of the measuring vane 42', as shown by the arrow 170 in FIGURE 13, establishes a fluid sealing engagement with substantially no perceptible fluid loss from the measuring chamber 101.

In FIGURE 14, the fluid wedge 174 is between the retracted inner actuator portion and the circular portion of the face 143 of the actuator 142 to provide adequate fluid separation of the parts even though the fluid within the rotor 108 is isolated. All of the fluid passing out of the outlet 16 therefore must have passed through the measuring chamber 101 and must produce accurate rotation of the rotor vanes 42, 42', and 42''.

Figure 10:
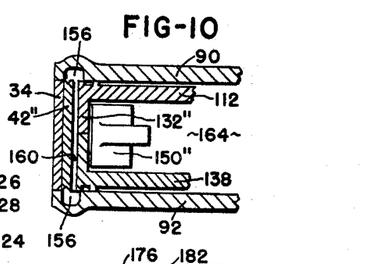
FIGURE 10 is a vertical cross sectional view along the line 10—10 of FIGURE 1.
Figure 11:
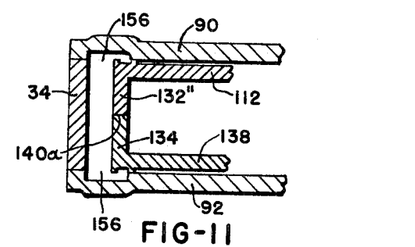
FIGURE 11 is a vertical cross sectional view along the line 11—11 of FIGURE 1.
Figure 12:
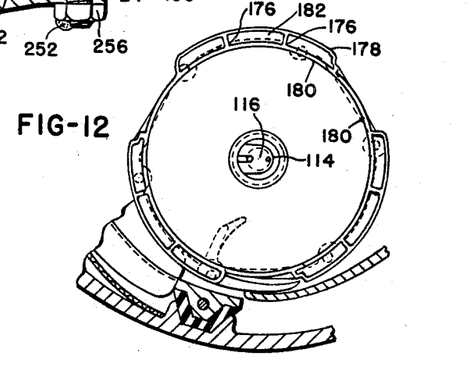
FIGURE 12 is a horizontal view, partly in elevation and partly in cross section, along the line 12—12 of FIGURE 2.

In FIGURES 2 and 12, there is shown a construction in which bypassing of fluid between the top side of the top rotor wall 112 and the bottom side of the bottom rotor wall 138 is prevented by the formation of a plurality of partitions or fluid seal bearings 176 on the top of the wall 112 and the bottom of the wall 138. Also narrow circular fluid seal walls or lands 178 and 180 provide a very close contact with the stationary cylinder heads 90 and 92, which are shown in FIGURES 10 and 11.

In FIGURE 12, clearance spaces 182 are formed by the arrangement of the narrow circular seal lands 178 and 180 and the angularly spaced radial narrow seal lands 176 for the purpose of effecting fluid seal between the inflowing and outflowing fluids by employing the minimum of seal areas. This reduces to a minimum the contact area of surface friction between the rotating top side of the top rotor wall 112 and the cylinder head 90 and between the bottom side of the bottom wall 138 and the cylinder head 92. At the same time, the angularly spaced radial seal bearings 176 prevent a circular or radial movement or leakage along the edge of these contacting areas. At the same time, an imperceptible fluid skin contact is provided between the relatively moving walls so that the same type of non-fractional skin contact is produced as has been described in connection with FIGURES 13 and 14. The clearance areas 182 (see FIGURE 12) between these walls provide arresting areas, which tend to prevent a leakage at this point, and prevent an edgewise leakage along these contacting areas. The angular spacing of seal lands 176 are shorter than the length of seal lands on the zero torque side of the cylinder heads.

The cylinder outlet 38 may be provided with an annular resilient outflow seal 80, which is V-shaped in cross section and received in an annular channel or groove 79a (see FIGURE 4) around the outlet 38. The seal 80 has the apex of the V received within the V-shaped channel 82, which is formed in a lip 84 of the housing casting 12 and a lip 86 in the resilient liner 22. The lip 86 of the resilient liner 22 also has a straight V-shaped seal groove 88 to receive a bottom lip portion 79b of the outflow seal 80.

Figure 18:
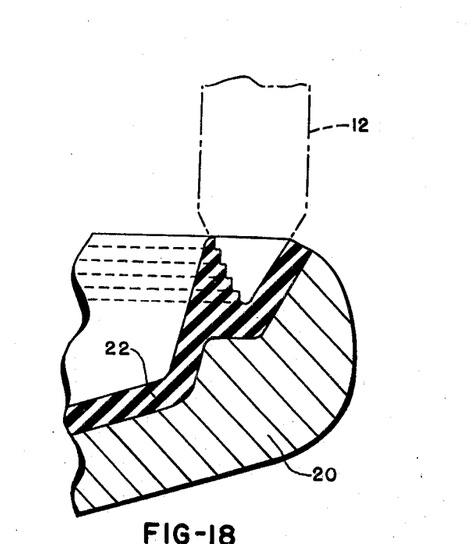
FIGURE 18 is an enlarged sectional view of the multiple tip seal shown at the lower left corner of FIGURE 4.

The V-shaped rim 18 of the bottom opening of the housing casting 12 has a seal surface perimeter 50a, which is engaged by a unique multiple continuous stepped lip seal 50 (see FIGURE 18) of the resilient liner 22. On the outside of the V-shaped rim 18 is a positive stop engagement 18a (see FIGURE 4) for the closure liner 22 to maintain proper working positions of the parts within the housing 10 and to position the resilient V-shaped multiple lip seal 50.

The resilient bottom closure liner 22 also performs the following additional functions:

(a) It supports the cylinder assembly.
(b) It engages, locates, and supports the inflow screen 166, where required, within the housing 10.
(c) It engages, locates, and supports the inflowing rotor-filling fluid filter 44, where required.
(d) It engages, locates, supports, and seals the bottom of the outflow seal 80.

The resilient liner 22 is nested in the outer closure bottom plate 20. It should be understood that the resilient liner 22 and the bottom plate 20 may be combined into one part for some usages.

ARTICULATION AT THE ZERO TORQUE SEAL LINE (SEE FIGURES 3 AND 4)

In the irregular cylinder side wall, the articulating portion 34 extends the full height between the cylinder heads 90 and 92. The articulating portion 34 has radially outward yielding capability at the zero torque seal line 34a between the inflow and outflow zones where the articulating portion 34 is sealingly in engagement with the perimeter wall of the rotor 108 or the retracted measuring vane (shown as 42' in FIGURE 3) for the purpose of accomplishing a highly efficient seal.

Figure 7:
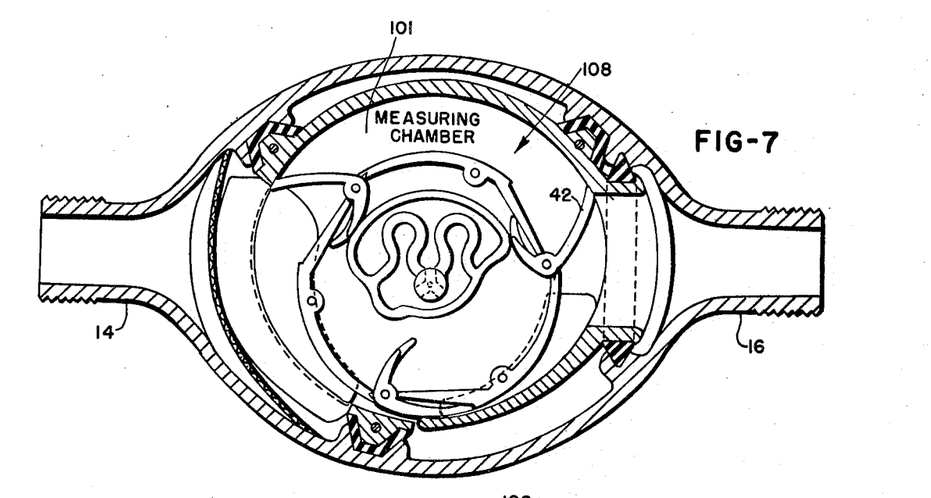
FIGURE 7 is the same view as FIGURE 1 but showing reference numbers relating to the means of transmitting the action of the measuring section of the device to attached or remote registers or other devices.
Figure 8:
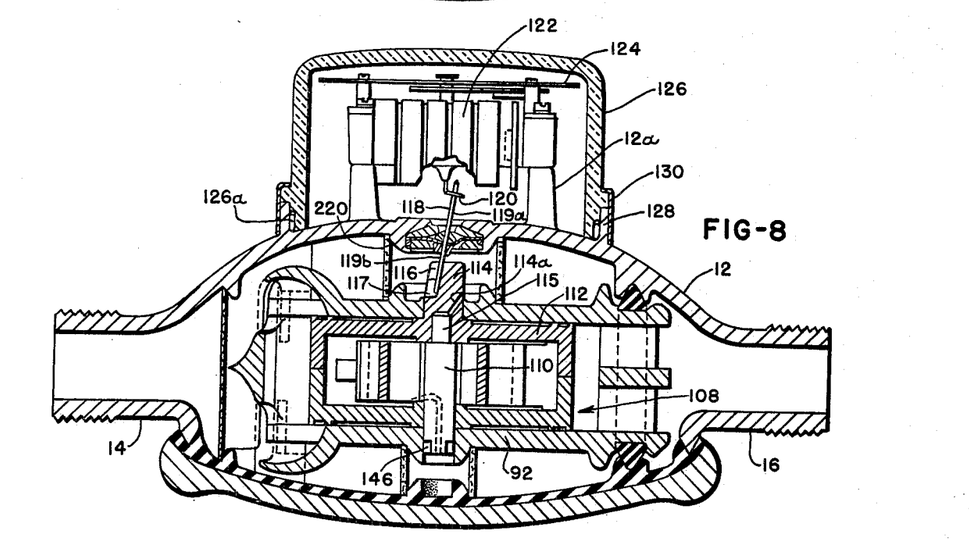
FIGURE 8 is the same view as FIGURE 2 but showing reference numbers relating to those shown in FIGURE 7.

THE ACTUATOR SHAFT (SEE FIGURES 1, 7 AND 8)

The stationary actuator bottom bearing shaft 110 extends downward and has a number of the built-in locating keys 146 (see FIGURES 2 and 8) that engage keyways in the bottom cylinder head 92 at the axis of the rotor 108. A portion of the shaft 110 serves as a bearing for the bottom portion of the rotatable rotor 108. The actuator 142 is stationarily located within the rotor 108.

The actuator stationary shaft 110 contains the passageway 168 for the fluid to fill the rotor 108. (See FIGURE 2.) The upper extending portion 115 of the actuator shaft 110 has its bearing in the upper portion of the rotor.

The actuator shaft 110 is designed so that although the shaft 110 is keyed firmly by the spline-shaped keys 146 to the bottom cylinder head 92, upon freeze or expansion of fluids, the top rotor half 112 and the bottom rotor half 138 together with the shaft keys 146 may move upward and downward using the shaft 110 as though it were a full floating pin.

ELIMINATION OF FOREIGN PARTICLES

The cylinder wall articulated portion 34, which is between the outflow port 38 and a cylinder wall opening 72, is free to yield outwardly to permit foreign particles to be automatically removed and immediately thereafter the yielding parts return to normal sealed position. This yielding also occurs during freeze expansion.

Figure 17:
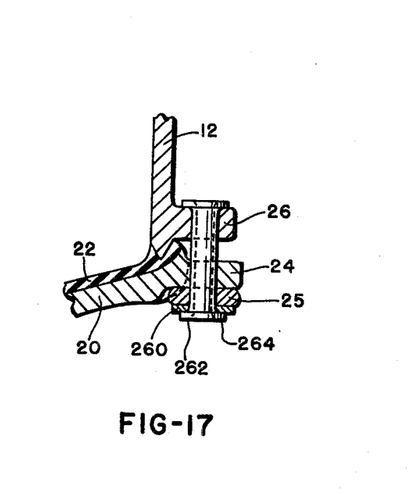
FIGURE 17 is a sectional view showing a modification of FIGURE 16 in which a hollow rivet is employed instead of a bolt and nut.

In addition to the articulated design of the cylinder 30 and the rotor 108, the bottom housing closure 20 with its resilient liner 22 may be held in place by use of a resilient housing closure as shown in FIGURES 16 and 17 and explained hereinafter.

The full floating cylinder pins 64 are located in the resilient ends 224 of the retainers 62 so that upon freeze expansion the cylinder heads 90 and 92 may yield to provide an increased volume in the cylinder construction caused by freeze expansion. The same is true with respect to the vane pivot pins 148 and the rotor alignment pins 140, which are full floating and which will permit the rotor halves to yield. The seal 80 also permits yielding of the heads 90 and 92.

Hence, if the interior of the meter should become frozen, the parts inside the fluid meter can expand sufficiently to prevent damage of the parts by the formation of ice or other solid frozen material.

In FIGURE 16, there is shown means to permit the bottom plate 20 to yield and allow for freeze expansion and subsequent restoration upon melting of the liquid. A number of these constructions may be used as a part of the articulating system of a meter. The lug 26 on the housing casting 12 has an opening to receive a bolt 258, which extends through an aligned opening in the lug 24 on the closure plate 20. A nut 250 is attached to the lower end of the bolt 258 and retains a resilient retainer spacer 25 and a thin-slip washer 25a between the resilient spacer 25 and the nut 250.

The resilient retainer spacer 25 yielding compresses when expansion occurs in the housing during freezing. Upon melting, the compressed resilient retainer spacer 25 expands and returns the resilient liner 22 and the bottom closure plate 20 to their normal operating position.

One side of the thin-slip washer 25a clings to the resilient spacer 25 while the other side provides a sliding surface to engage the nut 250 when the nut 250 is tightened. There is also a solder-weld 252, which secures the nut 250 to the bolt 258.

The housing casting 12 has a plurality of lugs 26 and the closure plate 20 has a plurality of lugs 24 through which a plurality of the bolts 258 are assembled. When assembling, the nut 250 is tightened sufficiently on the bolt 258 to maintain the required tension on the closure plate 20 and the liner 22 so as to hold the system fluid pressure.

FIGURE 17 is like FIGURE 16 except that each of the bolt and nut constructions of FIGURE 16 is replaced by a flanged hollow rivet 262 having a bottom flange 264. A support washer 260 is disposed between the resilient spacer 25 and the flange 264 of the hollow rivet 262. When assembling, after applying the required pressure sufficiently to position the closure plate 20 and the resilient liner 22 in place, the rivet 262 has its top flange formed in place. This feature is an important element of the invention.

BACKFLOW PROTECTION UPON SYSTEM FAILURE (SEE FIGURES 3 AND 4)

When, for any reason, the inflow fluid pressure fails and the previously measured fluid returns under pressure to the meter, the articulating cylinder portion 34 of the cylinder side wall (see FIGURE 3) yields and permits the backflowing fluid to pass by and through the zero torque seal line 34a at which the pressure causes the articulating wall 34 to open. This backflowing fluid then passes backwards through the meter to the original source of supply lines. This permits backflow of the fluid without damage to the meter or reversal of the register amounts. Upon effective reduction or elimination of the backflow pressure, the articulating portion 34 of the cylinder side wall returns to normal seal engagement at the zero torque seal line 34a.

A backward fluid flow causes each of the vane tips 51 in the measuring chamber 101 to open the seal of the vane tips 51 with the cylinder wall portion 32 as a relief valve. This opening of the seal is enabled by the resilience of the actuator 142.

When system failure or reverse backward fluid flow takes place, the stabilizer 301 moves into locking position at a point beyond the concentric portion of the actuator face.

At this point, it is the back-flow of fluid that causes retraction of the measuring vane 42' (in the arrangement of FIGURE 1) to move the stabilizer 301 into extended locked-stop position with the actuator 142.

Upon return to normal fluid flow, the vanes 42, 42', and 42" and their stabilizers 301 return to normal operating condition.

Figure 5:
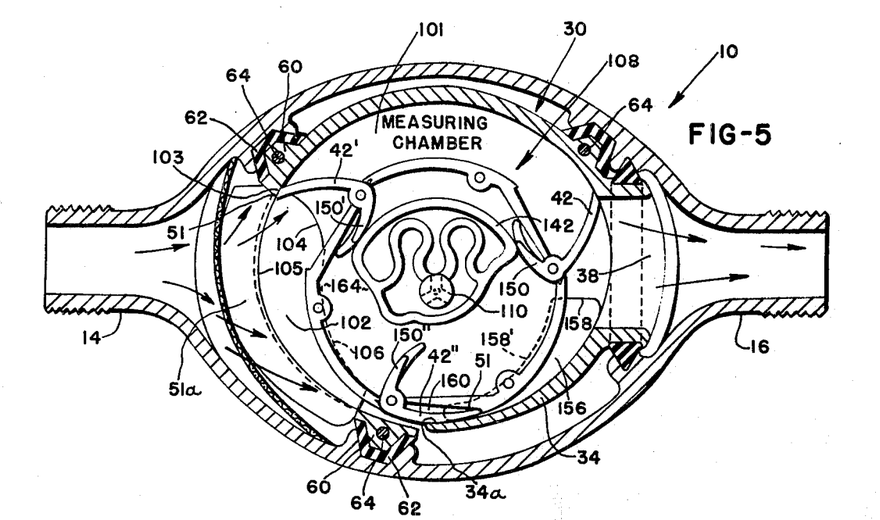
FIGURE 5 is the same view as FIGURE 1 but showing reference numbers relating to the system for fluid control and accommodation of the vanes.

THE FLUID VANE EXTENSIONS AND ACCOMMODATING SYSTEM (SEE FIGURES 5 AND 6)

As the fluid leaves the measuring chamber 101 on its way to the outflow port 38, it moves through a progressively narrowing area. (See FIGURE 5.) This is because the space between the articulated portion 34 of the side wall of the irregular cylinder 30 and the perimeter wall of the rotating rotor 108 is progressively narrowed from the measuring chamber 101 to the zero torque seal line 34a.

Within this diminishing area, the gradually retracting measuring vane 42 is driven by the rotating rotor 108 to its fully retracted position at the zero torque seal line 34a, which is the seal line between the outflow zone and the inlet zone of the meter.

Moreover, as the measuring vane moves toward the zero torque seal line 34a, there is a progressively diminishing and comparatively small amount of fluid in the path of each of the retracting measuring vanes 42, 42', and 42". This fluid escapes through relief cavities (one shown at 156 in FIGURE 5) in the top and bottom cylinder heads 90 and 92.

The relief cavity 156 is indicated in FIGURE 5 by the solid line 158 and the dotted line 158', which is shown dotted since part of the relief cavity 156 is under the rotor bottom wall 138. Hence the lines 158, 158' and the articulated portion 34 indicate the outer boundaries in this illustration of the relief cavity 156 in the bottom head 92.

The relief cavities 156 receive fluid from between the rotating rotor 108 and each of the retracting measuring vanes 42, 42', and 42". When each of the measuring vanes 42, 42', and 42" becomes fully retracted at the seal line 34a between the fluid outlet zone and the fluid inlet zone, the fully retracted measuring vane and the top and bottom side walls of the rotor assembly 108 form a cavity 160 (see FIGURES 5 and 10). The cavity 160 in connection with the relief cavities 156 permits full retraction of each of the measuring vanes.

For practical purposes, this escaping fluid in the outlet zone merely moves through the relief cavities 156 from the area between the retracting vane and the perimeter of the rotor 108 to the outer side of the same measuring vane. Meanwhile, the main body of fluid continues to move directly from the inlet port 14 through the measuring chamber 101 and directly to the outlet port 16.

While each of the measuring vanes 42, 42', and 42" is passing through the measuring chamber 101, the inner portions 150, 150', and 150", respectively, of the same vanes within the enclosed rotating rotor 108 are traversing the actuator 142 along its face 153, which is concentric with an adjacent to the measuring chamber 101. Thereafter, the clearance space between the tip of the inner portion of the vane and the face of the actuator 142 rapidly increases to permit full extension of the inner portion of the vane at the time its outer measuring vane portion reaches the zero torque seal line 34a.

After the fully retracted measuring vane is moved past the zero torque seal line 34, the measuring vane is subjected to two extending actions within the inlet zone as is described hereinbelow.

COUNTER-FLOW ACTION TO EXTEND THE MEASURING VANES (FIGURES 5 AND 6)

As the vane tip 51 of the measuring vane 42" (see FIGURE 5) moves past the outflow and inlet seal line 34a, the measuring vane 42" is free to start vane extension. Immediately past the zero torque seal line 34a, the fully extended inner actuator portion 150" moves into a counter-flow fluid zone 164 (see FIGURES 5 and 10) wherein the counter fluid force against the leading face of the extended inner actuator portion 150″ causes the outer portion of the measuring vane 42″ to start progressively extending outwardly.

A predetermined portion of this counter-flowing fluid is permitted to escape through the clearance around the edges of the inner actuator portion 150″. The remaining fluid, moving in counter-flow, moves the actuator vane 150″ counter to the rotation of the rotor 108 and thereby extends the outer portion of the measuring vane 42″. As rotation of the rotor continues, the measuring vane 42″ is progressively extended to its fully extended position at 103. (See FIGURE 5.)

Simultaneously, the inner actuator portion 150″ is moving toward its fully retracted position between the inner wall of the rotor 108 and the circular face of the actuator 142.

DIRECT INCOMING FLUID ACTION ALSO EXTENDS THE MEASURING VANES (SEE FIGURES 5, 6, AND 9)

The inflowing fluid through the inlet 14 initially divides by means of the divider 51a, which is disposed in inlet port 52 of the cylinder 30, has the dividing edge 54 to provide upper and lower flowing streams 56 and 58. The upper stream 56 rolls upward and immediately reaches the inward rolling baffle 94, which is part of the cylinder head 90 and forms a curved passageway 98. The stream 56 is guided not merely to the tip 51 of each of the measuring vanes 42, 42′, and 42″, but downward and inward to an inflow cavity 102.

The bottom flow stream 58 rolls downward and immediately reaches the inward rolling baffle 96, which is a part of the bottom cylinder head 92 and forms a curved passageway 100. The stream 58 is guided not merely to the tip 51 of the measuring vane 42′ but upward and inward to the inflow cavity 102.

The two streams 56 and 58 merge in the inflow cavity 102 and the flow is directed around the measuring vane edge which is used for sealing to the cylinder head and thereafter is directed to the trailing face of the measuring portions of each of said vanes behind the same extending measuring vane 42′. It is apparent that only one of the two streams 56 and 58 may be used.

The purpose is to prevent the force of the fluid stream entering the inlet port 52 from impounding against the forward or leading face of each of the measuring vanes 42, 42′, and 42″ as each of the measuring vanes is being progressively extended clockwise toward its extended position at 103. (See FIGURES 5, 6, and 9.)

It will be noted that in this illustration the upper and lower cylinder heads 90 and 92 of the cylinder construction are generally flat to the right of the edge 104 and are curved as shown in the baffles 94 and 96 to the left of the line 104.

To assist in this full extension of the measuring vane 42″, for example, the rotor 108 rotates the measuring vane 42″ to a point where its vane tip 51 moves to the beginning of inflowing fluid adjacent to the inflow fluid divider 51a where the inflowing divided fluid streams flow. The inflowing fluid from the inlet extension cavity or zone 102 is directed as stated above and progressively moves each measuring vane toward the beginning of the measuring chamber and to full vane extended positions and sealing engagement at 103.

An inner wall 105 of the divider 51a forms a tracking bridge, guide, or limit for the tip end 51 of each of the measuring vanes 42, 42′, and 42″ (see FIGURE 5) as each of the measuring vanes travels clockwise along the inner wall 105.

The inner edges of the baffles 94 and 96 are shown in FIGURE 5 by a full line 104 and a dotted line 106, underneath the rotor 108, which shows the inner boundary of the inflowing fluid cavity 102. The outer boundary of the inflowing fluid cavity 102 is the inner wall 105 of the divider 51a.

Meanwhile, this inflowing fluid direct action on the trailing face of the outer portion of the measuring vane 42″ has been and continues to be assisted by the previously described counterflow action within the enclosed rotor 108 against the inner actuator portion 150″ until the outer portion of the measuring vane 42″ is fully extended.

THE SYSTEM OF MEASURING ROTOR TURNS (SEE FIGURES 7 AND 8)

The rotor 108 rotates clockwise about the central stationary shaft 110, which is secured by the keys 146 to the lower stationary cylinder head 92. The rotor 108 includes the upper flat wall or plate 112, which has an opening to receive the smaller upper end 115 of the stationary actuator shaft 110 and to rotate about it.

The wall 112 has the upward rotating driver shaft 114, which has an upward funnel shape 116. The funnel shape 116 initially engages and positions a measuring chamber end 119b of a nutating shaft 118 and causes the shaft 118 to move into its angular position in a driving notch 117 in the driver shaft 114.

The driving notch 117 is in driving engagement with the nutating shaft 118 to cause the shaft 118 to nutate as a result of fluid passing through the measuring chamber 101. Top end 119 of the nutating shaft 118 engages a register input shaft drive arm 120 to cause rotation and drive the registering or indicating device 122.

The registering device 122 may be of any well known type and may have indicating dials 124 to record and indicate the amount of fluid that has passed through the measuring chamber 101. The indicating device 122 may be placed in and covered by a transparent dome 126, which may be secured to an upwardly extending wall 128 of the housing casting 12 by any suitable means such as by a flanged ring 130.

In this manner, the measuring vanes cause the rotor 108 to rotate and this, in turn, causes the nutating shaft 118 to nutate and engage the register drive shaft 120 resulting in the shaft 120 rotating to drive the register 122. This means will indicate the amount of fluid that has passed through the measuring chamber 101.

It should be observed that the upper end 119a of the nutating shaft 118 is sealingly separated by a non-permeable diaphragm assembly, from the lower part of the nutating shaft 119b.

In the rotating driver shaft 114, there is the lubricating and relief passageway 114a (see FIGURE 8) from the housing 10 by way of clearance of the upper actuator shaft portion 115 in the rotor 108 to the fluid within the rotor 108. This provides communication between the fluid in the rotor 108 and the fluid in the housing 10 while assuring lubrication of the upper actuator shaft portion 115.

The fluid in the rotor 108 and in the nutating shaft driving area are both filtered and isolated.

THE REGISTRY CHAMBER AND VIEWER

A standard register assembly is affixed to top register mounting bosses 12a, which are located on the outside top of the housing casting 12. (See FIGURE 8.)

A ring seal 126a is placed on a portion of the transparent register viewer 126. The viewer 126 is then seal-inserted in place on top of the housing 10 within which the register 122 has been mounted. The viewer retainer ring 130 is then secured in place. (See FIGURE 8.)

An advantage of this invention is that it may be used in environments where freezing temperatures occur without damage to any part of the fluid flow meter. Another advantage of this invention is that accidental reversal of fluid flow will not cause reverse rotation of the meter and the registering device. A further advantage of this invention is that wear of the parts in the measuring chamber is reduced due to uniform sealing between each vane and the wall of the measuring chamber. Still another advantage of this invention is that foreign particles in the fluid are automatically eliminated.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:
1. In combination:
   (a) a cylinder having an inlet port and an outlet port to allow flow of liquid therethrough;
   (b) a rotatable structure within said cylinder and cooperating therewith to form a flow passageway from said inlet port to said outlet port, said flow passageway having a uniform measuring chamber portion, said rotatable structure being in sealing engagement with a portion of said cylinder; said rotatable structure including:
      (i) a self-enclosed hollow rotor mounted for rotation about a fixed axis, said rotor comprising separable parts normally in sealed relation to each other, and means to permit movement of said separable parts relative to each other when liquid in said rotor freezes, and means to cause the automatic return of said separable parts of said rotor to their sealed relation when the frozen liquid melts;
      (ii) a plurality of vanes pivotally mounted on said rotor, each said vane including a first portion inside said rotor and a second portion outside said rotor;
   (c) means for filling the interior of said rotor with a substantially isolated liquid; and
   (d) actuator means within said rotor, said actuator means cooperating with the interior of said rotor and said first portion of each said vane to define a define a diminishing chamber whereby said substantially isolated liquid within said rotor is effective to bias said first portion of each said vane thereby to move said second portion of each said vane to the extended position prior to entry of said second portion into said substantially uniform measuring chamber portion of said flow passageway.

2. The combination claimed in claim 1 wherein said cylinder includes a top head, a bottom head, and a side wall, and means to permit separable movement of said top head and said bottom head when liquid in said cylinder freezes and to return said top head and said bottom head to their original relation when the frozen liquid melts.

3. The combination claimed in claim 1 including divider means disposed across said inlet port and having an inner wall defining a limit for the free end of said second portion of said vanes as said vanes pivot from the fully retracted position to the fully extended position, said divider means dividing the liquid entering said port into two streams, one of said streams passing above said divider means and the other of said streams passing below said divider means.

4. The combination claimed in claim 1 including means associated with said first portion of each said vanes, said last mentioned means cooperating with the interior of said rotor to prevent the free end of said second portion of each of said vanes from contacting said cylinder during movement through said measuring chamber portion.

5. The combination claimed in claim 1 wherein said means to provide for the automatic return of said separable parts of said rotor comprises expansible alignment means in said rotor, said expansible alignment means consisting of full floating alignment pins extending between said separable rotor parts.

6. The combination claimed in claim 1 including a housing surrounding said cylinder and supporting said cylinder in spaced relation thereto, said housing having an inlet opening and an outlet opening and comprising separable parts, means securing said separable parts together in a closed relation, said securing means including means to permit separable movement of said parts of said housing when liquid in said housing freezes and to return said separable parts of said housing to their normal closed relation when the frozen liquid melts.

7. In combination; a housing having inlet and outlet openings to allow flow of liquid through said housing; said housing including separable parts; means securing said separable parts of said housing together in a closed relation; said securing means including means to permit separable movement of said separable parts of said housing when liquid in said housing freezes and to return said separable parts of said housing to their closed relation when the frozen liquid melts; a cylinder disposed within said housing and having an inlet port and an outlet port to allow flow of liquid through said cylinder; a shaft disposed within said cylinder and attached to said cylinder to prevent rotation of said shaft; said shaft being splined to a portion of said cylinder to permit longitudinal movement between said shaft and said cylinder when liquid in said cylinder freezes; an enclosed rotor disposed within said cylinder and rotatably mounted on said shaft; means for filling said rotor with a substantially isolated liquid; said rotor having a plurality of vanes pivotally attached; thereto each said vane having a first portion inside said rotor and a second portion outside said rotor; said rotor being rotated by fluid acting on said vanes; said rotor comprising separable parts normally in closed relation to each other; and means to permit separable movement of said separable parts of said rotor when liquid freezes and to return said separable parts of said rotor to their closed relation when the frozen liquid melts; said cylinder including a top head, a bottom head, and a side wall; and means to permit separable movement of said top head and said bottom head when liquid in said cylinder freezes and to return said top head and said bottom head to their normal relation when the frozen liquid melts.

8. The combination according to claim 7 in which said permitting means of said housing securing means includes a resilient member.

References Cited

UNITED STATES PATENTS

| 1,530,044 | 3/1922 | Geuex | 43—44.86 |
| 1,294,760 | 2/1919 | Bowser | 91—148 |
| 602,377 | 4/1898 | Thomson | 73—277 |
| 600,173 | 3/1898 | Robarts | 91—142 |
| 148,994 | 3/1874 | Swann et al. | 91—142 |
| 116,362 | 6/1871 | Slaughter | 91—145 |

FOREIGN PATENTS 7,907  10/1905  Denmark.

JAMES J. GILL, Primary Examiner
J. W. WHALEN, Assistant Examiner